United States Patent [19]
Fratangelo et al.

[11] Patent Number: 5,370,931
[45] Date of Patent: * Dec. 6, 1994

[54] FUSER MEMBER OVERCOATED WITH A FLUOROELASTOMER, POLYORGANOSILOXANE AND COPPER OXIDE COMPOSITION

[75] Inventors: Louis D. Fratangelo, Fairport; Santokh S. Badesha; Arnold W. Henry, both of Pittsford; Robert M. Ferguson, Penfield; David H. Pan; George J. Heeks, both of Rochester; Victor Berko-Boateng, Penfield; Lieng-Huang Lee, Webster, all of N.Y.

[73] Assignee: Xerox Corporation, Stamford, Conn.

[*] Notice: The portion of the term of this patent subsequent to Nov. 24, 2009 has been disclaimed.

[21] Appl. No.: 67,924

[22] Filed: May 27, 1993

[51] Int. Cl.$^5$ .................. B32B 15/08; B32B 27/00
[52] U.S. Cl. ........................... 428/334; 355/279; 428/421; 428/447; 428/450; 428/457; 428/461; 428/469; 430/124; 528/24; 528/32
[58] Field of Search ............. 428/469, 369, 332, 334, 428/339, 402, 421, 422, 447, 757, 761, 906, 450; 430/98, 99, 124; 355/285, 279; 528/24, 32

[56] References Cited

U.S. PATENT DOCUMENTS

| | | | |
|---|---|---|---|
| 4,029,827 | 6/1977 | Imperial et al. | 427/22 |
| 4,272,179 | 6/1981 | Seanor | 355/3 FU |
| 4,777,087 | 10/1988 | Heeks et al. | 428/321.1 |
| 4,853,737 | 8/1989 | Hartley et al. | 355/289 |
| 4,853,737 | 8/1989 | Hartley et al. | 355/289 |
| 5,017,432 | 5/1991 | Eddy et al. | 428/422 |
| 5,061,965 | 10/1991 | Ferguson et al. | 355/284 |
| 5,141,788 | 8/1992 | Badesha et al. | 428/36.8 |
| 5,166,031 | 11/1992 | Badesha et al. | 430/124 |
| 5,166,031 | 11/1992 | Badesha et al. | 430/124 |

*Primary Examiner*—D. S. Nakarani
*Assistant Examiner*—Stephen Sand
*Attorney, Agent, or Firm*—E. O. Palazzo

[57] ABSTRACT

A fuser member comprised of a supporting substrate comprising an outer layer of a volume grafted elastomer, which is a substantially uniform integral interpenetrating network of a hybrid composition of a fluoroelastomer and a polyorganosiloxane, said volume graft having been formed by dehydrofluorination of said fluoroelastomer by a nucleophilic dehydrofluorinating agent, followed by addition polymerization by the addition of an alkene or alkyne functionally terminated polyorganosiloxane and a polymerization initiator; and wherein said outer layer contains a reactive metal oxide in an amount of from about 2 to about 7 weight percent.

12 Claims, 1 Drawing Sheet

FUSER MEMBER OVERCOATED WITH A FLUOROELASTOMER, POLYORGANOSILOXANE AND COPPER OXIDE COMPOSITION

The following patents assigned to the assignee of the present application are recited. U.S. Pat. No. 5,017,432 with an effective filing date of Sep. 11, 1989, entitled Fuser Member in the name of Clifford O. Eddy et al.; U.S. Pat. No. 5,061,965, filed Apr. 30, 1990 entitled Fusing Assembly With Release Agent Donor Member in the name of Robert M. Ferguson et al.; U.S. Pat. No. 5, 141,788 entitled Fuser Member in the name of Santokh S. Badesha et al.; and U.S. Pat. No. 5,166,031 which discloses a fuser member comprising a supporting substrate having an outer layer of a volume grafted elastomer which is a substantially uniform integral interpenetrating network of a hybrid composition of a fluoroelastomer and a polyorganosiloxane, said volume graft having been formed by dehydrofluorination of said fluoroelastomer by a nucleophilic dehydrofluorinating agent, followed by addition polymerization by the addition of an alkene or alkyne functionally terminated polyorganosiloxane and a polymerization initiator. The disclosures of each of the aforementioned patents are totally incorporated herein by reference.

BACKGROUND OF THE INVENTION

The present invention relates to a fuser member, a method of fusing toner images in electrostatographic reproducing apparatus and a method for fabricating fuser members. More specifically, the present invention relates to a fuser member, preferably in the form of a fuser roll, pressure roll or release agent donor roll with a coating thereover, and which coating contains metal oxides like a copper oxide.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 200° C. or higher depending upon the softening range of the particular resin used in the toner. It is undesirable, however, to increase the temperature of the substrate substantially higher than about 250° C. because of the tendency of the substrate to discolor or convert into a fire, at such elevated temperatures, particularly when the substrate is paper.

Several approaches to thermal fusing of electroscopic toner images have been described in the prior art. These methods include providing the application of heat and pressure substantially concurrently by various means, a roll pair maintained in pressure contact, a belt member in pressure contact with a roll, and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and they can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affects the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. To ensure and maintain good release properties of the fuser roll, it has become customary to apply release agents to the fuser roll during the fusing operation. Typically, these materials are applied as thin films of, for example, silicone oils to prevent toner offset.

Particularly preferred fusing systems are comprised of a heated cylindrical fuser roll having a fusing surface which is backed by a cylindrical pressure roll forming a fusing nip therebetween. A release agent donor roll is also provided to deliver release agent to the fuser roll. While the physical and performance characteristics of each of these rolls, and particularly of their functional surfaces are not precisely the same depending on the various characteristics of the fusing system desired, the same classes of materials are typically used for one or more of the rolls in a fusing system in an electrostatographic printing system.

One fusing system involved the use of silicone elastomer fusing surfaces, such as a roll with a silicone oil release agent which could be delivered to the fuser roll by a silicone elastomer donor roll. The silicone elastomers and silicone oil release agents used in such systems are described in numerous patents and fairly collectively illustrated in U.S. Pat. No. 4,777,087 to Heeks et al. While highly successful in providing a fusing surface with a very low surface energy to provide excellent release properties to ensure that the toner is completely released from the fuser roll during the fusing operation, these systems suffer from a significant deterioration in physical properties over time in a fusing environment. In particular, the silicone oil release agent tends to penetrate the surface of the silicone elastomer fuser members resulting in swelling of the body of the elastomer causing major mechanical failure including debonding of the elastomer from the substrate, softening and reduced toughness of the elastomer causing it to chunk out and crumble, contaminating the machine and providing nonuniform delivery of release agent. Furthermore, as described in U.S. Pat. No. 4,777,087, additional deterioration of physical properties of silicone elastomers results from the oxidative crosslinking, particularly of a fuser roll at elevated temperatures.

A more recent development in fusing systems involves the use of fluoroelastomers as fuser members which have a surface with a metal containing filler, which interact with polymeric release agents having functional groups, which interact with the metal containing filler in the fluoroelastomer surface. Examples of these fusing systems, fusing members and release agents, are described in U.S. Pat. No. 4,264,181 to Lentz et al, U.S. Pat. No. 4,257,699 to Lentz and U.S. Pat. No. 4,272,179 to Seanor. Typically, the fluoroelastomers are (1) copolymers of vinylidenefluoride and hexafluoropropylene, and (2) terpolymers of vinylidene fluoride, hexafluoropropylene and tetrafluoroethylene. Commercially available materials include VITON E430 TM, VITON GF TM and other VITON TM designations as Trademarks of E.I. DuPont de Nemours, Inc. as well as the FLUOREL TM materials of 3M Company. The preferred curing system for these materials is a nucleophilic system with a bisphenol crosslinking agent to generate a covalently crosslinked network polymer formed by the application of heat following basic dehydrofluorination of the copolymer. Exemplary of such a fuser member is an aluminum base member with a poly(-vinylidenefluoride-hexafluoropropylene) copolymer cured with a bisphenol curing agent having lead oxide filler dispersed therein and utilizing a mercapto functional polyorganosiloxane oil as a release agent. In those fusing processes, the polymeric release agents have functional groups (also designated as chemically reactive functional groups) which interact with the metal containing filler dispersed in the elastomer or resinous material of the fuser member surface to form a thermally stable film which releases thermoplastic resin toner and which prevents the thermoplastic resin toner from contacting the elastomer material itself. The metal oxide, metal salt, metal alloy or other suitable metal compound filler dispersed in the elastomer or resin upon the fuser member surface interacts with the functional groups of the polymeric release agent. Preferably, the metal containing filler materials do not cause degradation of or have any adverse effect upon the polymeric release agent having functional groups. Because of this reaction between the elastomer having a metal containing filler and the polymeric release agent having functional groups, excellent release and the production of high quality copies are obtained even at high rates of speed of electrostatographic reproducing machines.

While the mechanism involved is not completely understood, it has been observed that when certain polymeric fluids having functional groups are applied to the surface of a fusing member having an elastomer surface with a metal oxide, metal salt, metal, metal alloy or other suitable metal compounds dispersed therein there is an interaction (a chemical reaction, coordination complex, hydrogen bonding or other mechanism) between the metal of the filler in the elastomer and the polymeric fluid having functional groups so that the polymeric release agent having functional groups in the form of a liquid or fluid provides an excellent surface for release which has an excellent propensity to remain upon the surface of the fuser member. Regardless of the mechanism, there appears to be the formation of a film upon the elastomer surface which differs from the composition of the elastomer and the composition of the polymeric release agent having functional groups. This film, however, has a greater affinity for the elastomer containing a metal compound than the toner and thereby provides an excellent release coating upon the elastomer surface. The release coating has a cohesive force which is less than the adhesive forces between heated toner and the substrate to which it is applied and the cohesive forces of the toner. The interaction between the functional group of the polymeric release agent and the metal of the elastomer containing metal leads to an overall diminution of the critical or high surface energy of the metal in the metal containing filler.

Preferred elastomers include the fluoroelastomers, such as fluoroelastomers of vinylidenefluoride based fluoroelastomers, which contain hexafluoropropylene and tetrafluoroethylene as comonomers. Two of the most preferred fluoroelastomers are (1) a class of copolymers of vinylidenefluoride and hexafluoropropylene known commercially as VITON A TM and (2) a class of terpolymers of vinylidenefluoride, hexafluoropropylene and tetrafluoroethylene known commercially as VITON B TM. VITON A TM and VITON B TM and other VITON TM designations are trademarks of E.I. DuPont de Nemours and Company. Other commercially available materials include FLUOREL TM of 3M Company, VITON GH TM, VITON E60C TM, VITON B 910 TM, and VITON E 430 TM. The preferred curing system is a nucleophilic system with a bisphenol crosslinking agent to generate a covalently crosslinked network polymer formed by the application of heat following basic dehydrofluorination of the copolymer. The nucleophilic curing system also includes an organophosphonium salt accelerator. Some of the commercially available fluoroelastomer polymers which can be cured with the nucleophilic system are VITON E 60C TM, VITON B 910 TM, VITON E 430 TM, VITON A TM, VITON B TM, and VITON GF TM.

The use of polymeric release agents having functional groups which interact with a fuser member to form a thermally stable, renewable self-cleaning layer having superior release properties for electroscopic thermoplastic resin toners is described in U.S. Pat. Nos. 4,029,827 to Imperial et al., 4,101,686 to Strella et al. and 4,185,140 also to Strella et al. all commonly assigned to the assignee of the present invention. In particular, U.S. Pat. No. 4,029,827 is directed to the use of polyorganosiloxanes having mercapto functionality as release agents. U.S. Pat. Nos. 4,101,686 and 4,185,140 are directed to polymeric release agents having functional groups such as carboxy, hydroxy, epoxy, amino, isocyanate, thioether, and mercapto groups as release fluids.

While these fluoroelastomers have excellent mechanical and physical properties in that they typically have a long wearing life maintaining toughness and strength over time in a fusing environment, they can only be used with very expensive functional release agents and have to contain expensive interactive metal containing fillers. Typically, for example, the functional release agents are of the order of four times expensive as their nonfunctional conventional silicone oil release agents.

"Improving Release Performance of Viton Fuser Rolls", by Henry et al., *Xerox Disclosure Journal*, Volume 9, No.1, January/February 1984, discloses a fuser member made of a copolymer of vinylidenefluoride and hexafluoropropylene which has a tendency to react with the toner charge control agent producing increased crosslinking and thereby hardening as the double bonds of the fluoroelastomer become saturated to prevent further crosslinking by the addition of a silanic hydrogen compound, such as polymethylhydrosiloxane, to covalently bond the siloxane to the surface of this fluoroelastomer and thereby prevent further hardening, and in addition provide good release characteristics.

"Viton/RTV Silicone Fuser Release Overcoating", Ferguson et al., *Xerox Disclosure Journal*, Volume 11, No.5, September/October 1986, describes a fusing member wherein a fluoroelastomer such as a copolymer of vinylidenefluoride and hexafluoropropylene and an RTV Silicone Rubber are co-dissolved, co-sprayed and co-cured on an aluminum substrate to provide a uniform dispersion of silicone within the fluoroelastomer matrix. Such a fuser surface is described as having the mechanical strength of the fluoroelastomer and the release properties of the silicone, and may be used with traditional dimethyl silicone release fluids.

U.S. Pat. No. 4,853,737 to Heartly et al. describes a fuser roll comprising a cured fluoroelastomer containing pendant diorganosiloxane segments that are covalently bonded to the backbone of the fluoroelastomer. The siloxane is appended to the fluoroelastomer by adding to the composition to be cured a polydiorganosiloxane oligomer having functional groups such as phenoxy or amino groups to form the covalent bond. The fuser member preferably has a metal oxide containing filler to react with functional release agent.

In U.S. Pat. No. 5,166,031, the disclosure of which is totally incorporated herein by reference, there is illustrated a fuser member comprising a supporting substrate having an outer layer of a volume grafted elastomer which is a substantially uniform integral interpenetrating network of a hybrid composition of a fluoroelastomer and a polyorganosiloxane, said volume graft having been formed by dehydrofluorination of said fluoroelastomer by a nucleophilic dehydrofluorinating agent, followed by addition polymerization by the addition of an alkene or alkyne functionally terminated polyorganosiloxane and a polymerization initiator, and wherein said fluoroelastomer can be selected from a group consisting of poly(vinylidene fluoride-hexafluoro-propylene) and poly(vinylidene fluoridehexafluoropropylene-tetrafluoroethylene), and wherein said polyorganosiloxane is of the formula

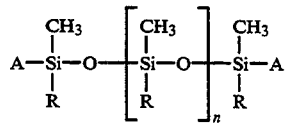

where R is an alkyl, alkenyl or aryl having less than 19 carbon atoms or an aryl group substituted with an amino, hydroxy, mercapto or alkyl or alkenyl group having less than 19 carbon atoms, the functional group A is an alkene or alkyne, preferably with 2 to 8 carbon atoms. Disadvantages that may be associated with the aforementioned fusing member include its lack of substantial toughness, that is for example this member can be relatively less wear resistant, and thus reduced fuser life; the amount of polyorganosiloxane in the graft coating may not, in certain situations, be sufficient that it can release effectively from paper without the use of a release fluid; inadequate release characteristics with mercapto functional oils, and thus adding small amounts of copper oxide, from about 2 to about 7 percent by weight provide sufficient anchoring sites for the functional oil to enable adequate release to paper; amounts higher than 7 percent and lower than 2 percent cause, for example, release problems. There is thus a need to overcome or minimize the aforementioned disadvantages and more specifically a need to reduce the amount of copper oxide that is added to fuser coatings to levels where the fuser surface does not degrade, and desirable adequate release characteristics are obtained for extended time periods during use in, for example, a xerographic imaging or printing apparatus. These and other needs can be achieved with the fuser members of the present invention.

SUMMARY OF THE INVENTION

In an embodiment of the present invention, the fuser member and fusing system employing the same has an outer layer of a volume grafted elastomer, which is a substantially uniform integral interpenetrating network of a hybrid composition of a fluoroelastomer and a polyorganosiloxane, said volume graft having been formed by dehydrofluorination of said fluoroelastomer by a nucleophilic dehydrofluorinating agent, followed by addition polymerization by the addition of an alkene or alkyne functionally terminated polyorganosiloxane and a polymerization initiator; and, thereafter, adding thereto a metal oxide like copper oxide in effective amounts of, for example, from about 1 to about 20 and preferably from about 1 to about 5 weight percent, thereby extending fuser roll life, enhancing toner release capability, and minimizing fluoroelastomer degradation.

In a further aspect of the present invention, the fluoroelastomer is selected from the group consisting of poly(vinylidene fluoridehexafluoropropylene) and poly(vinylidene-hexafluoropropylenetetrafluoroethylene), reference copending U.S. patent application Ser. No.045,023, the disclosure of which is totally incorporated herein by reference.

In a further aspect of the present invention, the polyorganosiloxane is of the formula:

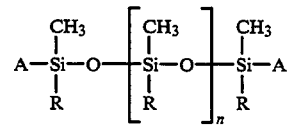

where R is an alkyl, alkenyl or aryl having less than 19 carbon atoms or an aryl group substituted with an amino, hydroxy, mercapto or alkyl, or alkenyl group having less than 19 carbon atoms. The functional group A is an alkene or alkyne having 2 to 8 carbon atoms or an alkene or alkyne substituted with an alkyl or aryl having less than 19 carbon atoms, and n is 2 to 350.

Examples of metal oxides, preferably in a particulate form or size obtained by ball milling, present in various effective amounts, such as for example from about 2 to about 30 parts per 100 parts of fuser roll material like VITON TM selected include copper oxide, silver oxide and the like embodiments. Dispersions of the metal oxides obtained from ball milling can be spray coated in a thickness, for example, of from about 10 to about 20 microns, onto the fusing substrate. The oxides are preferably incorporated into the fuser roll film surface where they chemically reac with functional oils thereby resulting in a thin, for example about 2 to about 10 monolayers, film of the oil onto the surface of the fusing member and which provides uniform and improved release of the paper through the fusing nip in a xerographic apparatus.

In a further aspect of the present invention, the dehydrofluorinating agent is selected from the group consisting of primary, secondary and tertiary aliphatic and aromatic amines where the aliphatic and aromatic groups have from 2 to 15 carbon atoms, and aliphatic and aromatic diamines and triamines having from 2 to 15 carbon atoms.

In a further object of the present invention, the dehydrofluorinating agent is a primary aliphatic amine such as an alkyl amine having up to 19 carbon atoms.

In a further object of the present invention, the polymerization initiator is selected from the group consisting of aliphatic and aromatic peroxides with benzoyl peroxide azoisobutyronitrile being preferred.

In a further object of the present invention, the supporting substrate is a cylindrical sleeve having an outer layer of from 12.5 to about 125 micrometers thick.

In a further object of the present invention, the fuser member includes an intermediate elastomer layer such as a silicone or fluoroelastomer layer, and the volume grafted layer is an overcoating.

In a further object of the present invention, the fuser member is used as pressure roll, fuser roll or release agent donor roll.

Also, in embodiments there can be selected as the fuser roll coating to which is added metal oxides or ceramers.

Additionally, it is another object of the present invention to add metal oxides like copper oxides in certain amounts to fuser roll coatings to provide sufficient anchoring sites for functional release oils, and thereby allow excellent toner release characteristics from such members.

Moreover, another object of the present invention to add metal oxides like copper oxides in small amounts of from 2 to 7 percent to fuser roll coatings to thereby prevent or minimize roll degradation when interacting with charge control agents present in the toner composition; and wherein undesirable oil gels do not form on the surface of the fuser roll.

Figure 1:
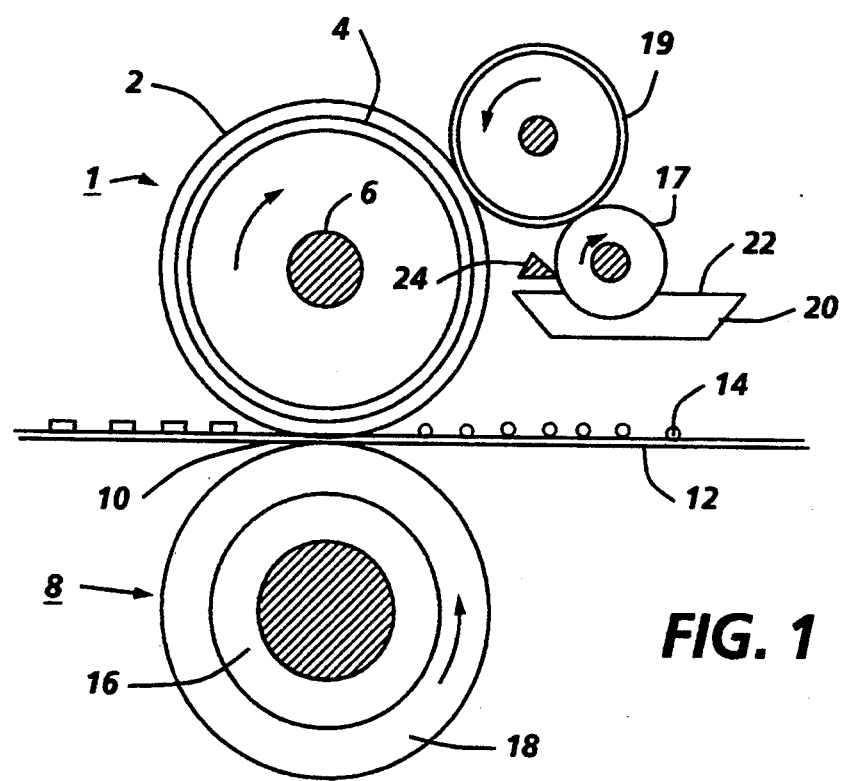
FIG. 1 represents a sectional view of a fuser system which may use the fuser member of the present invention.

By the term volume graft, it is intended to refer to, in embodiments, a substantially uniform integral interpenetrating network of a hybrid composition, wherein both the structure and the composition of the fluoroelastomer and polyorganosiloxane are substantially uniform when taken through different slices of the fuser member.

The term interpenetrating network is intended to refer to, in embodiments, the addition polymerization matrix where the fluoroelastomer and polyorganosiloxane polymer strands are intertwined in one another.

The term hybrid composition is intended to define a volume grafted composition which is comprised of fluoroelastomer and polyorganosiloxane blocks randomly arranged.

DETAILED DESCRIPTION OF THE PRESENT INVENTION

A typical fuser member of the present invention is described in conjunction with a fuser assembly as shown in FIG. 1 where the numeral 1 designates a fuser roll comprising elastomer surface 2 upon a suitable base member 4, and wherein the elastomer contains copper oxide in an amount of about 5 percent in embodiments, a hollow cylinder or core fabricated from any suitable metal, such as aluminum, anodized aluminum, steel, nickel, copper, and the like, having a suitable heating element 6 disposed in the hollow portion thereof which is coextensive with the cylinder. Backup or pressure roll 8 cooperates with fuser roll 1 to form a nip or contact arc 10 through which a copy paper or other substrate 12 passes such that toner images 14 thereon contact elastomer surface 2 of fuser roll 1. As shown in FIG. 1, the backup roll 8 has a rigid steel core 16 with an elastomer surface or layer 18 thereon. Sump 20 contains polymeric release agent 22 which may be a solid or liquid at room temperature, but it is a fluid at operating temperatures.

In the embodiment shown in FIG. 1 for applying the polymeric release agent 22 to elastomer surface 2, two release agent delivery rolls 17 and 19 rotatably mounted in the direction indicated are provided to transport release agent 22 from the sump 20 to the elastomer surface. As illustrated in FIG. 1, roll 17 is partly immersed in the sump 20 and transports on its surface release agent from the sump to the delivery roll 19. By using a metering blade 24, a layer of polymeric release fluid can be applied initially to delivery roll 19 and subsequently to elastomer 2 in controlled thickness ranging from submicrometer thickness to thickness of several micrometers of release fluid. Thus, by metering device 24, about 0.1 to 2 micrometers or greater thicknesses of release fluid can be applied to the surface of elastomer 2.

Fuser member may be a roll, belt, flat surface or other suitable shape used in the fixing of thermoplastic toner images to a suitable substrate. It may take the form of a fuser member, a pressure member or a release agent donor member, preferably in the form of a cylindrical roll. Typically, the fuser member is made of a hollow cylindrical metal core, such as copper, aluminum, steel and the like, and has an outer layer of the selected cured fluoroelastomer. Alternatively, there may be one or more intermediate layers between the substrate and the outer layer of the cured elastomer if desired. Typical materials having the appropriate thermal and mechanical properties for such layers include silicone elastomers, fluoroelastomers, EPDM and TEFLON ® PFA sleeved rollers.

The volume grafting according to the present invention is performed in two steps, the first involves the dehydrofluorination of the fluoroelastomer preferably using an amine. During this step, hydrofluoric acid is eliminated which generates unsaturation, carbon to carbon double bonds, on the fluoroelastomer. The second step is the free radical peroxide induced addition polymerization of the alkene or alkyne terminated polyorganosiloxane with the carbon to carbon double bonds of the fluoroelastomer. In embodiments, the copper oxide or other metal oxide can be added to a solution containing the graft copolymer. To this solution is then added basic oxides like magnesium or calcium, together with the CURATIVE VC-50 ™ and the contents ball jar milled to a fine particle dispersion, about 3 to 5 microns volume average diameter. The dispersion is then spray coated onto the fuser member.

The fluoroelastomers useful in the practice of the present invention are those described in detail in the above referenced U.S. Pat. Nos. 4,257,699; 5,017,432 and 5,061,965. As described therein these fluoroelastomers, particularly from the class of copolymers and terpolymers of vinylidenefluoride hexafluoropropylene and tetrafluoroethylene, known commercially under various designations as VITON A ™, VITON E ™, VITON E60C ™, VITON E430 ™, VITON 910 ™, VITON GH ™ and VITON GF ™. The VITON ™ designation is a Trademark of E.I. DuPont de Nemours, Inc. Other commercially available materials include FLUOREL 2170 ™, FLUOREL 2174 ™, FLUOREL 2176 ™, FLUOREL 2177 ™ and FLUOREL LVS 76 ™, FLUOREL ™ being a Trademark of 3M Company. Additional commercially available materials include AFLAS ™ a poly(propylene-tetrafluoroethylene), FLUOREL II ™ (LII900) a poly(propylene-tetrafluoroethylenevinylidenefluoride) both also available from 3M Company as well as the Tecnoflons identified as FOR-60KIR ™, FOR-LHF ™, NM ™, FOR-THF ™, FOR-TFS ™, TH ™, TN505 ™ available from Montedison Specialty Chemical Company. Typically, these fluoroelastomers are cured with a nucleophilic addition curing system, such as a bisphenol crosslinking agent with an organophosphonium salt accelerator as described in further detail in the above referenced U.S. Pat. No. 4,257,699 and U.S. Pat. No. 5,017,432.

In a particularly preferred embodiment, the fluoroelastomer is one having a relatively low quantity of vinylidenefluoride, such as in VITON GF ™, available from E.I. DuPont de Nemours, Inc. The VITON GF ™ has 35 mole percent of vinylidenefluoride, 34 percent of hexafluoropropylene and 29 mole percent of tetrafluoroethylene with 2 percent cure site monomer. It is generally cured with a conventional aliphatic peroxide curing agent.

The polyorganosiloxane having functionality according to the present invention has the formula:

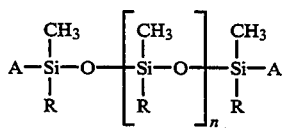

where R is an alkyl, alkenyl or aryl having less than 19 carbon atoms or an aryl group substituted with an amino, hydroxy, mercapto or an alkyl or alkenyl group having less than 19 carbon atoms. The functional group A is an alkene or alkyne group having 2 to 8 carbon atoms or an alkene or alkyne substituted with an alkyl or aryl group having less than 19 carbon atoms, and preferably from 1 to about 12 carbon atoms; and n is from 2 to about 400, and in embodiments to about 350. In the above formula, typical R groups include methyl, ethyl, propyl, octyl, vinyl, allylic crotnyl, phenyl, naphthyl and phenanthryl, and typical substituted aryl groups are substituted in the ortho, meta and para positions with lower alkyl groups having less than 15 carbon atoms. Furthermore, in a preferred embodiment n is between 60 and 80 to provide a sufficient number of reactive groups to graft onto the fluoroelastomer. Typical alkene and alkenyl functional groups include vinyl, acrylic, crotonic and acetenyl which may typically be substituted with methyl, propyl, butyl, benzyt, and tolyl groups, etc.

The dehydrofluorinating agent which attacks the fluoroelastomer generating unsaturation is selected from the group of strong nucleophilic agents such as peroxides, hydrides, bases, oxides, etc. The preferred agents are selected from the group consisting of primary, secondary and tertiary, aliphatic and aromatic amines, where the aliphatic and aromatic groups have from 2 to 15 carbon atoms. It also includes aliphatic and aromatic diamines and triamines having from 2 to 15 carbon atoms where the aromatic groups may be benzene, toluene, naphthalene or anthracene, etc.. It is generally preferred for the aromatic diamines and triamines that the aromatic group be substituted in the ortho, meta and para positions. Typical substituents include lower alkylamino groups such as ethylamino, propylamino and butylamino with propylamino being preferred. Specific amine dehydrofluorinating agents include N-(2-aminoethyl-3-aminopropyl)-trimethoxy silane, 3-(N-strylmethyl-2aminoethylamino) propyltrimethoxy silane hydrochloride and (aminoethylamino methyl) phenethyltrimethoxy silane.

Other adjuvants and fillers may be incorporated in the elastomer in accordance with the present invention as long as they do not affect the integrity of the fluoroelastomer. Such fillers normally encountered in the compounding of elastomers include coloring agents, reinforcing fillers, crosslinking agents, processing aids, accelerators and polymerization initiators. Following coating of the fluoroelastomer on the substrate, it is subjected to a step curing process at about 93° C. for 2 hours, followed by 2 hours at 149° C., 2 hours at 177° C. and 16 hours at 208° C.

The dehydrofluorinating agent generates double bonds by dehydrofluorination of the fluoroelastomer compound so that when the unsaturated functionally terminated polyorganosiloxane is added with the initiator, the polymerization of the siloxane is initiated. Typical free radical polymerization initiators for this purpose are benzoyl peroxide and azoisobutyronitrile, AIBN.

The substrate for the fusing member, including donor fuser rolls and pressure fuser rolls, according to the present invention may be of any suitable material. Typically, it takes the form of a cylindrical tube of aluminum, steel or certain plastic materials chosen to maintain rigidity, instructural integrity, as well as being capable of having the silicone elastomer coated thereon and adhered firmly thereto. In one embodiment, the core which may be a steel cylinder is degreased with a solvent and cleaned with an abrasive cleaner prior to being primed with a primer, such as Dow Corning 1200, which may be sprayed, brushed or dipped, followed by air drying under ambient conditions for thirty minutes and then baked at 150° C. for 30 minutes. A silicone elastomer intermediate layer may be applied according to conventional techniques such as injection molding and casting after which it is cured for up to 15 minutes and at 120° to 180° C. to provide a complete cure without a significant post cure operation. This curing operation should be substantially complete to prevent debonding of the silicone elastomer from the core when it is removed from the mold. Thereafter, the surface of the silicone elastomer is sanded to remove the mold release agent and it is wiped clean with a solvent such as isopropyl alcohol to remove all debris. The intermediate layer can also be prepared from fluoroelastomers like VITON GF ™, wherein a typical composition is prepared, for example, by adding 30 parts per 100 parts of VITON GF ™ carbon black like REGAL N991 ®, followed by rubber milling in a Banberry mill and, thereafter, injection molded onto a metal core.

The outer layer of the fuser member is preferably prepared by dissolving the fluoroelastomer in a typical solvent, such as methyl ethyl ketone, methyl isobutyl ketone and the like, followed by stirring for 15 to 60 minutes at 45° to 85° C. after which the polymerization initiator which is generally dissolved in an aromatic solvent, such as toluene is added with continued stirring for 5 to 25 minutes. Subsequently, the polyorganosiloxane is added with stirring for 30 minutes to 10 hours at a temperature of 45° to 85° C. A nucleophilic curing agent such as, VITON CURATIVE VC-50 ™, which incorporates an accelerator, (a quaternary phosphonium salt or salts) and a crosslinking agent; bisphenol AF in a single curative system is added in a 3 to 7 percent solution predissolved in the fluoroelastomer compound. Optimally, the basic oxides, MgO and Ca(OH)$_2$, were added in particulate form to the solution mixture to effect the curing process. Providing the layer on the fuser member substrate is most conveniently accomplished by spraying, dipping, flow coating, or the like, a solution of the homogeneous suspension of the fluoroelastomer and polyorganosiloxane to a level film of about 12.5 to about 125 micrometers in thickness. This thickness range is selected as providing a layer thin enough to prevent a large thermal barrier for fusing and thick enough to allow a reasonable wear life. While molding, extruding and wrapping techniques are alternative means which may be used, we prefer to spray successive applications of the solvent solution. When the desired thickness of coating is obtained, the coating is cured and thereby bonded to the roll surface. A typical step curing process is heating for two hours at 93° C., followed by 2 hours at 149° C., followed by 2 hours at 177° C., followed by 16 hours at 208° C. The copper oxide is added in an amount of about 5 parts per 100 parts of the VITON ™ roll and this mixture is milled in a ball jar to provide the dispersion, 3 to 5 microns in diameter volume average, which dispersion is selected for the fabrication of the outer coated layer of the fusing member.

In another embodiment, the solvent may be removed by evaporation by known means, the residue rinsed with a hydrocarbon solvent, such as hexane, to remove unwanted reactants, if any, and the residue redissolved in the original solvent followed by the addition of CURATIVE VC-50 ™ together with basic oxides like magnesium oxide and calcium hydroxide, or mixtures thereof, and copper oxide, from about 2 to about 7 weight percent, and the subsequent formation of the outer layer.

The following Examples further define and describe fuser members prepared by the present invention and illustrate embodiment of the present invention. Unless otherwise indicated, all parts and percentages are by weight.

EXAMPLE I

An aluminum cylindrical sleeve was abraided with sand paper, followed by degreasing, scrubbing with an abrasive cleaner and thoroughly washing with water. A primer, Dow Corning primer DC 1200, was applied to a thickness of 2 to 3 tenths of a mil (5 to 7.5 micrometers), air dried at ambient conditions for 30 minutes and baked at 150° C. for 30 minutes. Subsequently, the primed core was provided with an intermediate layer of a liquid injection molded silicone elastomer by molding Dow Corning LSR590 to the primed core to a thickness of about 0.25 inch. The silicone elastomer was cured for 10 to 15 minutes at 150° C., but was not post cured. Following removal of the roll from the mold, the mold release material was sanded off and the roll was cleaned with isopropyl alcohol. Part A was prepared by dissolving 250 grams of VITON GF ™ in 2.5 liters of methylethyl ketone (MEK) by stirring at room temperature. This is accomplished by using a four liter plastic bottle and a moving base shaker. It takes approximately one hour to two hours to accomplish the dissolution depending upon the speed of the shaker. The above solution is then transferred to a four liter Erlenmeyer flask and 25 mil of the amine dehydrofluorinating agent, 3-(N-strylmethyl-2-aminoethylamino) propyltrimethoxysilane hydrochloride (S-1590, available from Huls America Inc. Piscataway, N.J.), was added. The contents of the flask were then stirred using a mechanical stirrer while maintaining the temperature between 55° and 60° C. After stirring for 30 minutes, 50 milliliters of 100 centistoke vinyl terminated polysiloxane (PS-441), also available from Huls America Inc., was added and stirring continued for another 10 minutes. A solution of 10 grams of benzoyl peroxide in a 100 milliliter mixture of toluene and MEK (80:20) was then added. The stirring was continued while heating the contents of the flask around 55° C. for another 2 hours. During this time, the color of the solution turned light yellow which then was poured into an open tray. The tray was left in the hood overnight (16 hours). The resulting yellow rubbery mass left after the evaporation of the solvent was then cut into small pieces with scissors. This material was then extracted extensively and repeatedly with 1,500 milliliters (three 500 milliliter portions) of n-hexane to remove unreacted siloxane, Next, 54.5 grams of Part A, the silicone grafted fluoroelastomer, together with 495 parts of methyl isobutyl ketone were added to a roll mill without media and rolled 17 to 24 hours until dissolved. Subsequently, 2 5 grams of DuPont CURATIVE VC50 ™ catalyst crosslinker in 25 parts of methyl ethyl ketone, 1.1 grams of calcium hydroxide, 2.2 grams of magnesium oxide, and 2.72 grams of copper oxide powder were added to the above part A, shaken for about 15 minutes and the solids content reduced to 5 to 7 percent by the addition of methyl isobutyl ketone. Following ball milling in the presence of media like steel balls, the mixture was air sprayed onto a silicone elastomer layer to a dry thickness of about 1.5 mils (40 micrometers) and cured in ambient dry air for 24 hours, followed by the above-mentioned post step curing procedure, 2 hours at 93° C., 2 hours at 149° C., 2 hours at 177° C., and 16 hours at 208° C.

A fuser member was then fabricated from the above-prepared dispersion by spray coating the dispersion 2 mils (50 microns) thick onto the above-mentioned liquid injection molded silicone elastomer layer.

Alternatively, the above process can be repeated with a solution of the volume graft and by avoiding the drying and redissolution steps.

The solution of Example I, first part, was diluted with methylisobutylketene, 186 milliliters, so that the solids only volume graft contents were reduced to 5.5 percent. Two liters of this solution had added thereto 1.1 grams of calcium hydroxide, and 5.5 grams of CURATIVE VC-50 TM catalyst crosslinker, and 5.5 grams of copper oxide were added. These components were then ball jar milled for 2 hours during which time a fine dispersion, 10 to 20 microns in average volume diameter, resulted as measured by Transmission Electron Microscope. The resulting dispersion was then spray coated, a continuous coating, on a silicone based fuser roll. The fuser was comprised of an aluminum metal core, silicone intermediate layer and an overcoating layer.

The fuser rolls prepared above were incorporated into a Xerox Corporation 5775 color imaging apparatus for 65,000 imaging cycles without failure of the rolls to perform and there was no evidence of roll degradation as determined by visual observation. When a fuser roll for a 5775 product with an overcoat made from a fluoroelastomer, such as 15 percent by weight of copper oxide, is used in fusing system transporting nonfunctional release agent fluid, a failure would be experienced before about 15,000 copies by failure in the print releasing and stripping from the fuser roll and instead wrapping around the fuser roll. Furthermore, such a roll when used as a pressure roll has found to exhibit excessive contamination of toner and poor release at about 2,000 copies.

Thus, according to the present invention, a long life fuser member has been provided, which is capable of use as a fuser roll, donor roll or pressure roll, in a fusing system which does not require the use of functional release agent or the presence of a metal containing filler in the transport surface of the fuser member to interact with the functional release agent to form a release layer. This enables an economical fusing system combining the advantages of fluoroelastomer fuser member surfaces and nonfunctional conventional silicone release agent.

All the patents and applications referred to herein are hereby specifically, and totally incorporated herein by reference in their entirety in the instant specification.

While the invention has been described in detail with reference to specific and preferred embodiments, it will be appreciated that various modifications and variations will be apparent to the artisan. All such modifications and embodiments as may readily occur to one skilled in the art are intended to be within the scope of the claims.

What is claimed is:

1. A fuser member consisting essentially of a supporting substrate comprising an outer layer of a grafted elastomer, which is a substantially uniform integral interpenetrating network of a hybrid composition of a fluorelastomer and a polyorganosiloxane, said graft having been formed by dehydrofluorination of said fluorelastomer by a nucleophilic dehydrofluorinating agent, followed by addition polymerization by the addition of an alkene or alkyne functionally terminated polyorganosiloxane and a polymerization initiator; and wherein said outer layer contains copper oxide in an amount of from 2 to 7 weight percent based upon the total weight of said outer layer.

2. A fuser member in accordance with claim 1 wherein said fluorelastomer is selected from the group consisting of poly(vinylidene fluoride-hexafluoropropylene) and poly(vinylidene fluoridehexafluoropropylene-tetrafluoroethylene).

3. A fuser member in accordance with claim 1 wherein said polyorganosiloxane has the formula

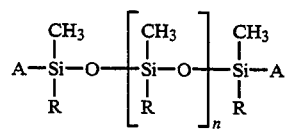

where R is an alkyl, alkenyl or aryl having less than 19 carbon atoms or an aryl group substituted with an amino, hydroxy, mercapto, $C_2$-$C_{19}$ alkyl or $C_2$-$C_{19}$ alkenyl group; the functional group A is an alkene or 2 to 8 carbon atoms or an alkene or alkyne substituted with an alkyl or aryl; and n is from about 2 to about 350.

4. A fuser member in accordance with claim 1 wherein said dehydrofluorinating agent is selected from the group consisting of primary, secondary and tertiary aliphatic and aromatic amines where the aliphatic and aromatic groups have from 2 to 15 carbon atoms and aliphatic and aromatic diamines and triamines having from 2 to 15 carbon atoms.

5. A fuser member in accordance with claim 4 wherein said dehydrofluorinating agent is selected from the group consisting of N-(2 aminoethyl-3-aminopropyl) trimethoxy silane, 3-(N-styrylmethyl-2aminoethylamino) propyltrimethoxy silane hydrochloride and (aminoethylamino methyl) phenethyltrimethoxy silane.

6. A fuser member in accordance with claim 1 wherein the polymerization initiator is a peroxide.

7. A fuser member in accordance with claim 6 wherein the peroxide is selected from the group consisting of benzoyl peroxide and azoisobutyronitrile.

8. A fuser member in accordance with claim 1 wherein said outer layer is from about 12.5 to about 125 micrometers thick.

9. A fuser member in accordance with claim 1 wherein said supporting substrate is a cylindrical sleeve.

10. A fuser member in accordance with claim 9 including an intermediate elastomer layer.

11. A fuser member in accordance with claim 1 wherein said member is a pressure roll, or a release agent donor roll.

12. A fuser member in accordance with claim 1 wherein the copper oxide is present in an amount of from between 2 to 5 weight percent based upon the total weight of said outer layer.

* * * * *